(12) United States Patent
Norton et al.

(10) Patent No.: US 8,223,453 B1
(45) Date of Patent: Jul. 17, 2012

(54) DISK DRIVE HAVING A VIBRATION ABSORBER WITH FIXED FREE ENDS

(75) Inventors: Amir Norton, San Jose, CA (US); August L. Klerks, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 990 days.

(21) Appl. No.: 12/181,592

(22) Filed: Jul. 29, 2008

(51) Int. Cl.
*G11B 33/14* (2006.01)

(52) U.S. Cl. .................................... 360/97.02
(58) Field of Classification Search .......... None
See application file for complete search history.

(56) References Cited

U.S. PATENT DOCUMENTS

| | | |
|---|---|---|
| 4,598,328 A | 7/1986 | Frangesh |
| 4,703,470 A | 10/1987 | Castagna et al. |
| 5,180,147 A | 1/1993 | Andersson et al. |
| 5,598,306 A | 1/1997 | Frees et al. |
| 5,740,011 A | 4/1998 | Kobayashi et al. |
| 6,125,097 A * | 9/2000 | Wu ................................. 720/692 |
| 6,178,156 B1 | 1/2001 | Kuwajima et al. |
| 6,349,464 B1 | 2/2002 | Codilian et al. |
| 6,456,580 B2 | 9/2002 | Lee |
| 6,690,540 B2 * | 2/2004 | Hirasaka et al. ........... 360/97.02 |
| 6,747,840 B2 | 6/2004 | Daniel et al. |
| 6,859,933 B2 | 2/2005 | Park et al. |
| 7,013,474 B2 | 3/2006 | Ito et al. |
| 7,260,821 B2 | 8/2007 | Amitani |
| 2002/0044374 A1* | 4/2002 | Hirasaka et al. ........... 360/97.01 |
| 2008/0137228 A1* | 6/2008 | Ueda et al. ................. 360/97.01 |

* cited by examiner

*Primary Examiner* — David D Davis

(57) ABSTRACT

A disk drive includes a disk drive base, a disk, an actuator arm actuatable over the disk, and a motor. The motor is operable to rotate the disk, and is coupled to the disk drive base. During operation of the disk drive, the motor emits vibrations at a source vibration frequency. A vibration absorber is coupled to the disk drive base, the vibration absorber including a cantilever beam having a fixed end and a free end.

19 Claims, 9 Drawing Sheets

DISK DRIVE HAVING A VIBRATION ABSORBER WITH FIXED FREE ENDS

BACKGROUND

Disk drives typically include a spindle motor for rotating one or more disks in order to read data from and write data to surfaces of the disks. The spindle motor includes a stator having a plurality of coils, and a rotor having one or more rotor magnets and a rotating motor hub on which the disks may be mounted and clamped. Different coils of the stator are alternately energized to form a changing electromagnetic field that pulls/pushes the rotor magnets, thereby rotating the motor hub. Rotation of the motor hub, in turn, results in rotation of the disks mounted thereto.

Although the motor hub and disks are typically balanced during the disk drive manufacturing process, the spindle motor often emits vibrations during operation of the disk drive due to slight imbalances in the motor itself or in the disk pack. Such imbalances are nearly impossible to completely eliminate, and become even more pronounced at the high rotational velocities reached by higher performance disk drives. The vibrations emitted by the spindle motor can degrade servo performance and can lead to undesirable vibration levels emitted by the disk drive.

There is therefore a need for a disk drive that causes less vibration.

DETAILED DESCRIPTION

Figure 1:
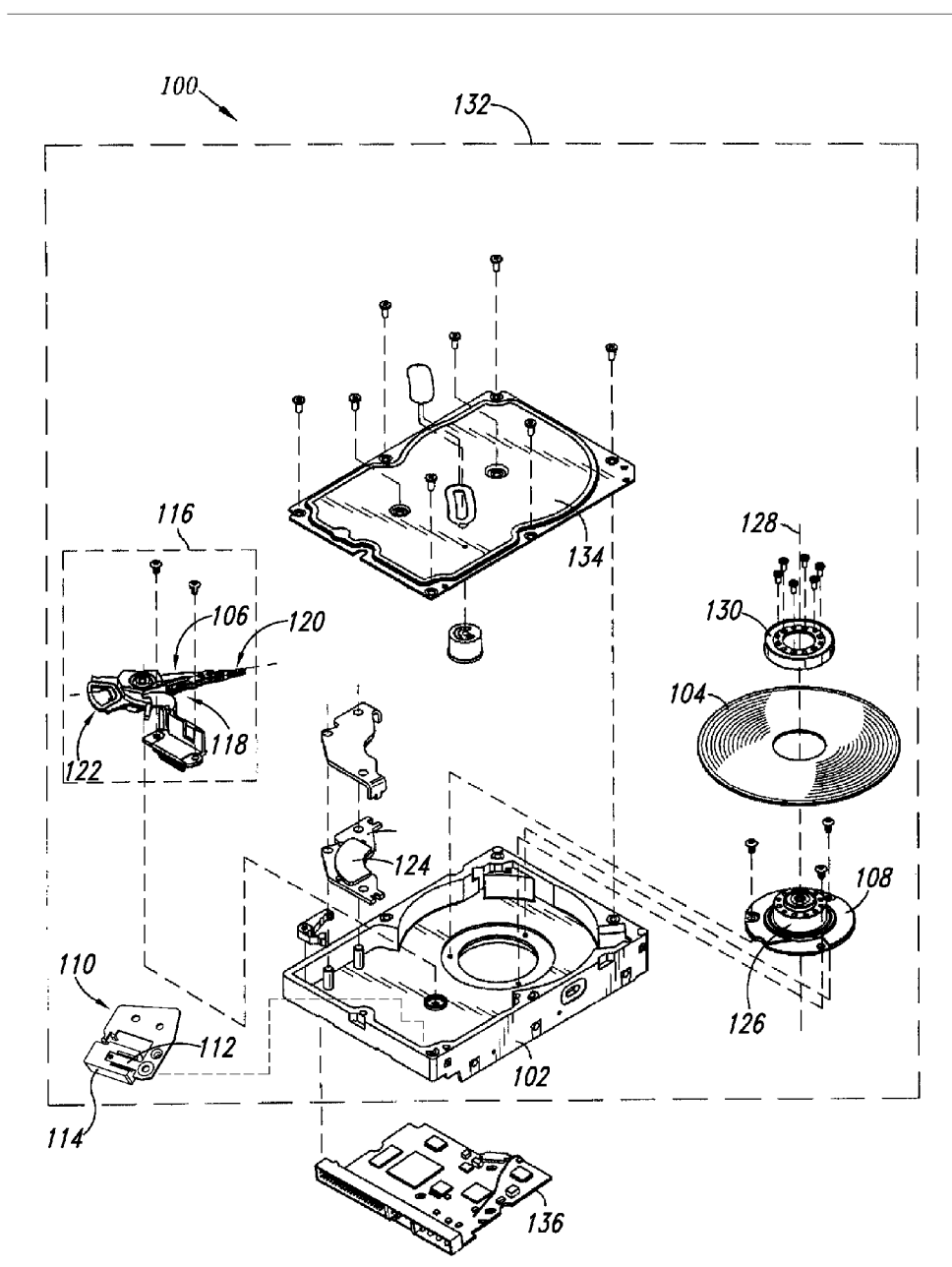
FIG. 1 is an exploded, perspective view generally illustrating an exemplary disk drive including a vibration absorber, according to one illustrated embodiment.

Referring to FIG. 1, an exemplary disk drive 100 is illustrated, according to one embodiment. The disk drive 100 comprises a disk drive base 102, a disk 104, and an actuator arm 106 actuatable over the disk 104. The disk drive 100 further comprises a motor 108 operable to rotate the disk 104, the motor 108 coupled to the disk drive base 102 and emitting vibrations at a source vibration frequency during operation of the disk drive 100. In the illustrated embodiment, a vibration absorber 110 is coupled to the disk drive base 102, the vibration absorber 110 including: a cantilever beam 112 having a fixed end and a free end; and a mass 114 coupled to the free end of the cantilever beam 112.

As illustrated herein, the disk drive 100 comprises a magnetic disk drive. However, the structures and devices described may also be applied to and/or implemented in other disk drives, including, e.g., optical and magneto-optical disk drives.

In one embodiment, the disk drive base 102 comprises a monolithic component to which many of the other disk drive components are coupled. For example, the disk drive base 102 may comprise a cast piece of aluminum. However, in other embodiments, different materials and other methods for manufacturing the disk drive base 102 may be used.

The disk 104 may comprise any of a variety of magnetic or optical disk media. The disk 104 may comprise a plurality of generally concentric tracks for storing data. In some embodiments, more disks 104 may be included in the disk drive 100.

In one embodiment, the actuator arm 106 forms part of a head stack assembly ("HSA") 116 that is rotatably attached to the disk drive base 102. The HSA 116 may define an actuator 118, from which the one or more actuator arms 106 extend. A head gimbal assembly ("HGA") 120 may be attached to a distal end of each actuator arm 106. Each HGA 120 includes a head for reading data from and writing data to surfaces of the disk 104. The HSA 116 may further include a coil 122 through which a changing electrical current may be passed. The coil 122 interacts with one or more magnets 124 to form a voice coil motor ("VCM") for controllably rotating the HSA 116.

As illustrated, the motor 108 is coupled to and is operable to rotate the disk 104. The motor 108 may include a motor hub 126 that is rotatably coupled to the disk drive base 102 and, in one embodiment, may comprise a spindle motor. The motor 108 and the motor hub 126 may be configured to rotate the disk 104 about a disk axis of rotation 128.

During operation of the disk drive 100, the motor 108 emits vibrations at a source vibration frequency. These vibrations may be due to small imbalances in the motor 108 and/or in the disk pack comprising the disk 104, a disk clamp 130, and screws coupling the disk clamp 130 to the motor 108. These vibrations may cause the disk drive base 102, and thus the entire disk drive 100 to vibrate at or near the source vibration frequency. In one embodiment, the source vibration frequency is equal to a rotational frequency of the motor 108 during operation of the disk drive 100. Thus, in one embodiment, the source vibration frequency may increase during start-up until the motor 108 is rotating at a substantially constant operational speed. For example, in a 5,400 revolutions-per-minute ("rpm") disk drive, the source vibration frequency during normal operation may be approximately 90 Hz. In a 10,000 rpm disk drive, the source vibration frequency may be approximately 167 Hz. Of course, the source vibration frequency may be any of a variety of frequencies depending upon the rotational frequency chosen for a particular disk drive.

The disk drive 100 may further comprise a vibration absorber 110. This vibration absorber 110 may comprise any of a variety of structures configured to vibrate at a resonant frequency. In the illustrated embodiment, the vibration absorber 110 may comprise a cantilever beam 112 having a mass 114 coupled to its free end. However, in other embodiments, the vibration absorber 110 may simply comprise a cantilever beam having a fixed end and a free end, but lacking a separate mass coupled to the free end.

As illustrated, the cantilever beam 112 of the vibration absorber 110 may extend generally parallel to a plane of the disk 104. In one embodiment, due in part to the geometry and positioning of the vibration absorber 110, the principal mode of vibration of the vibration absorber 110 may be generally aligned with the disk axis of rotation 128. In other embodiments, the vibration absorber 110 may be otherwise oriented within the disk drive base 102 and may be configured to vibrate along any axis within the disk drive 100. For example, the cantilever beam 112 may extend generally parallel to the disk axis of rotation 128.

The vibration absorber 110 may be coupled to the disk drive base 102 at any of a variety of locations. In one embodiment, the vibration absorber 110 may be coupled to the disk drive base 102 in a region of the disk drive base 102 farthest from the motor 108. Since the disk drive base 102 may achieve a maximum vibration-induced displacement in the region farthest from the motor 108, the damping achieved by the vibration absorber 110 may also be maximized at this location. In the illustrated rectangular disk drive 100, the region of the disk drive base 102 farthest from the motor 108 may be defined by at least one corner of the disk drive base 102. Thus, in one embodiment, the vibration absorber 110 may be coupled proximate a corner of the disk drive base 102 farthest from the motor 108. Given other disk drive geometries, other locations for the vibration absorber 110 may be chosen.

In one embodiment, the vibration absorber 110 may have a resonant frequency close to the source vibration frequency associated with the motor 108. The resonant frequency may be selected by adjusting, among other things, the material properties, geometry and coupling arrangement of the cantilever beam 112 and the mass 114. In one embodiment, the cantilever beam 112 and the mass 114 may have a resonant frequency within 10% of the source vibration frequency. In another embodiment, the cantilever beam 112 and the mass 114 may have a resonant frequency within 2% of the source vibration frequency. In yet another embodiment, the cantilever beam 112 and the mass 114 may have a resonant frequency substantially equal to the source vibration frequency.

During operation, the disk drive base 102 may be driven by the motor 108 to vibrate at approximately the source vibration frequency. The free end of the cantilever beam 112 and the mass 114 may then move in a fixed phase relationship to the vibrating motion of the disk drive base 102 at or near their resonant frequency and may thereby provide damping. Thus, in one embodiment, the overall emitted vibration of the disk drive 100 may be reduced with implementation of the vibration absorber 110. In some embodiments, the reduction may be so substantial that the motor 108 and the disk pack need not undergo a separate balancing operation during manufacturing.

The above disk drive components may form part of a head disk assembly ("HDA") 132. The HDA 132 may further include a cover 134, which, in combination with the disk drive base 102, may house the disk 104 and other disk drive components.

The disk drive 100 may further include a printed circuit board ("PCB") 136 having, inter alia, a disk drive controller for controlling read and write operations and a servo control system for generating servo control signals to position the actuator arms 106 relative to the disk 104.

Figure 2:
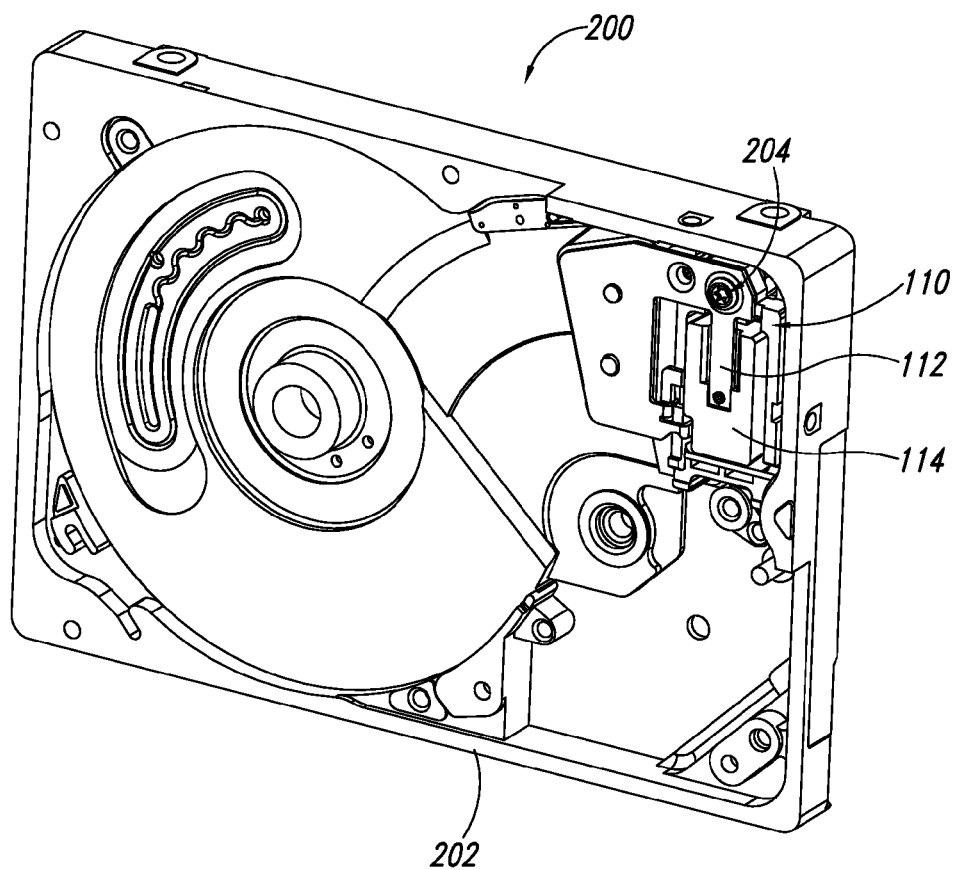
FIG. 2 is a perspective view illustrating a partial disk drive including the vibration absorber of FIG. 1, according to one illustrated embodiment.
Figure 3:
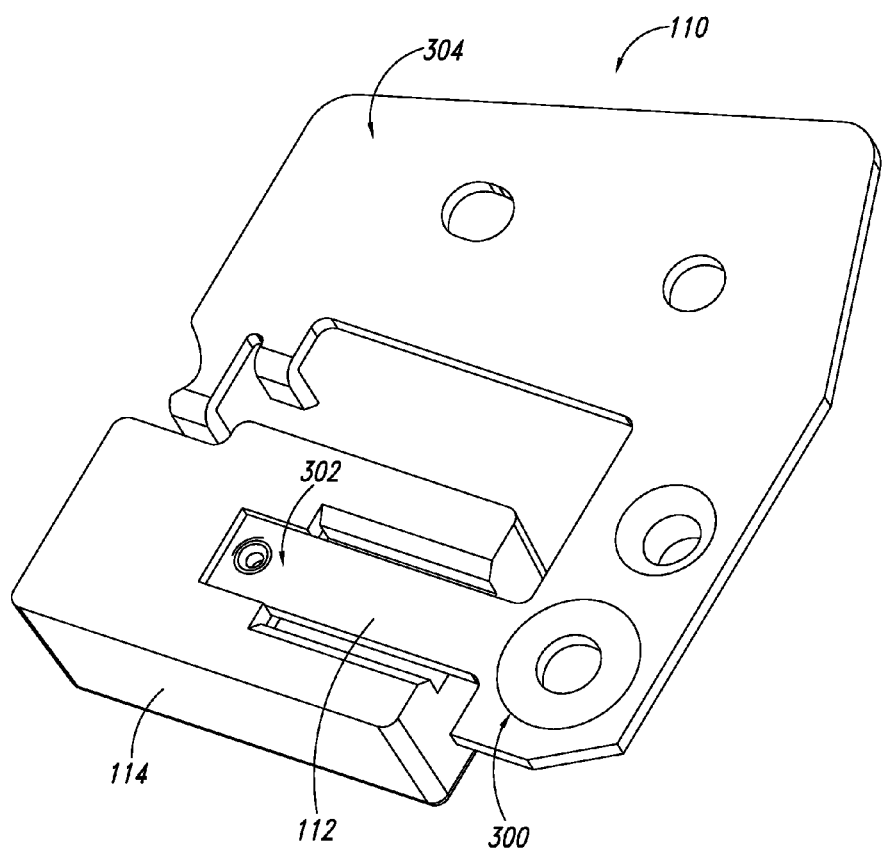
FIG. 3 is a top perspective view of the vibration absorber of FIG. 1, according to one illustrated embodiment.
Figure 4:
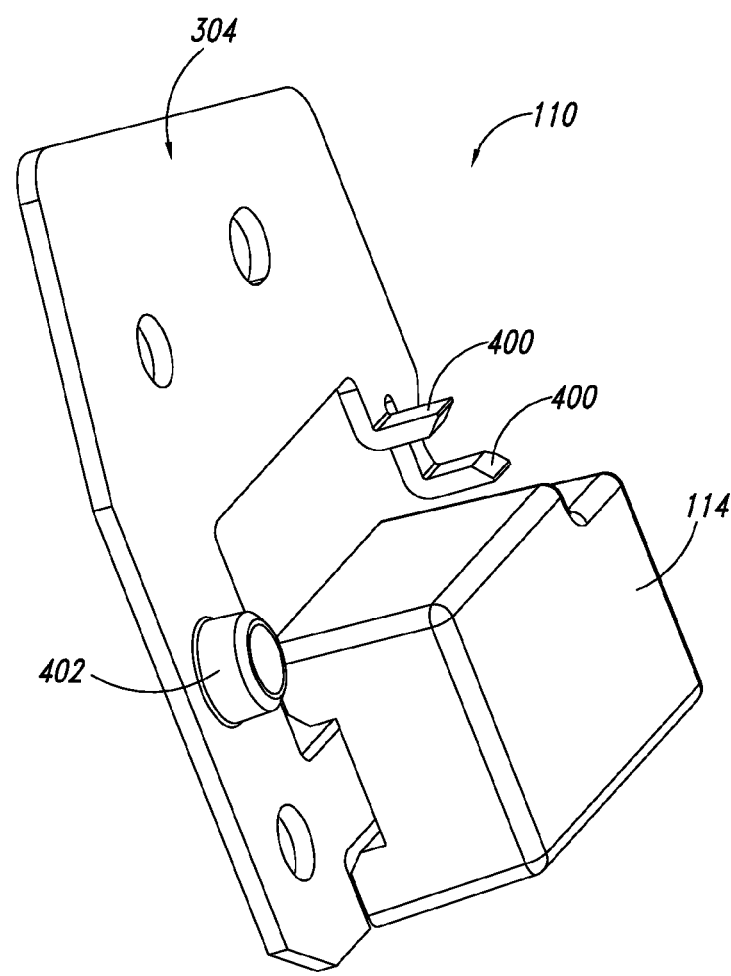
FIG. 4 is a side perspective view of the vibration absorber of FIG. 1, according to one illustrated embodiment.
Figure 5:
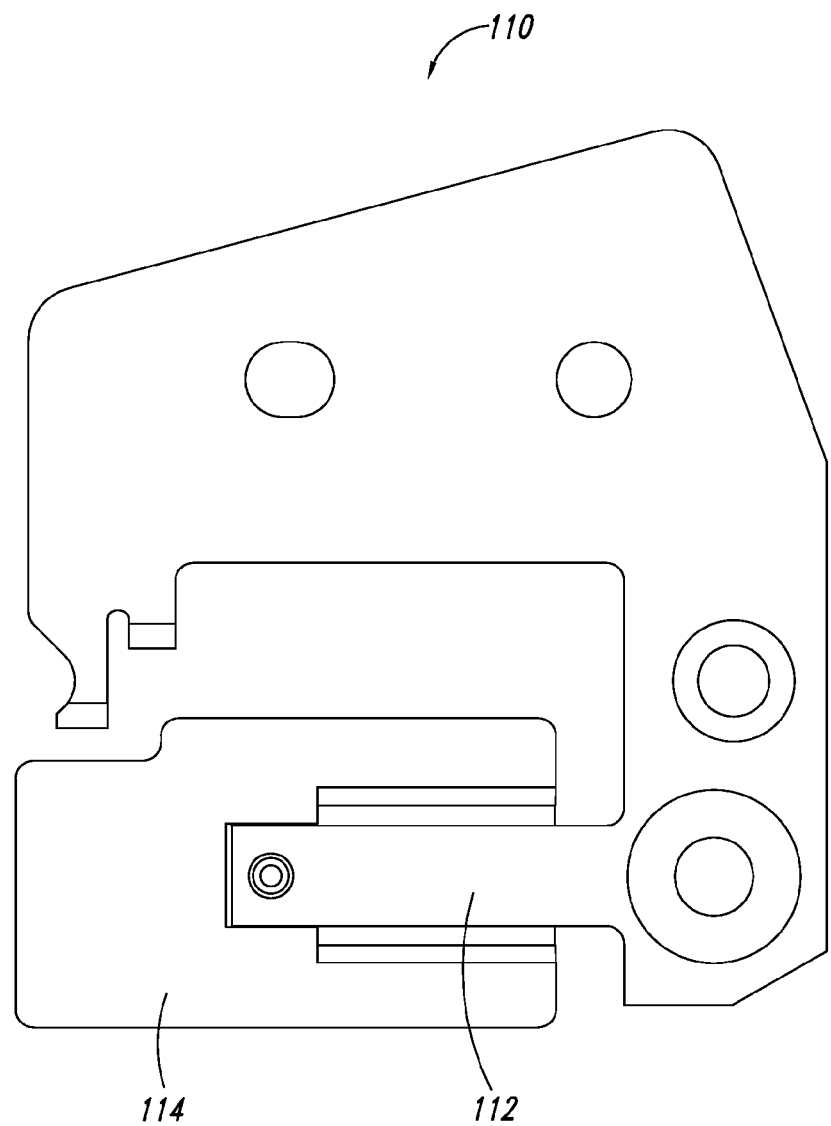
FIG. 5 is a top plan view of the vibration absorber of FIG. 1, according to one illustrated embodiment.
Figure 6:
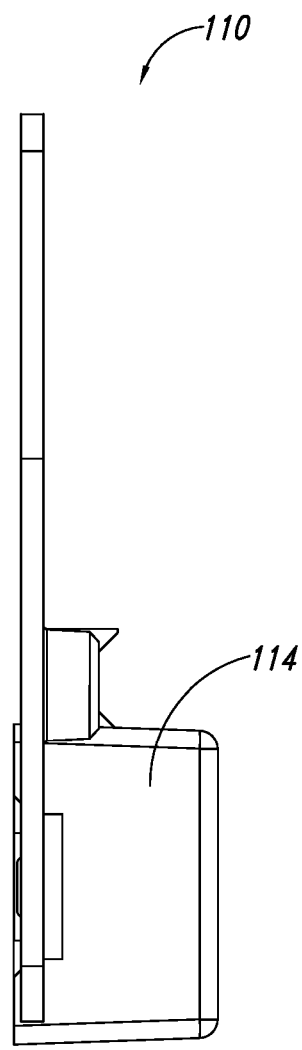
FIG. 6 is a side view of the vibration absorber of FIG. 1, according to one illustrated embodiment.
Figure 7:
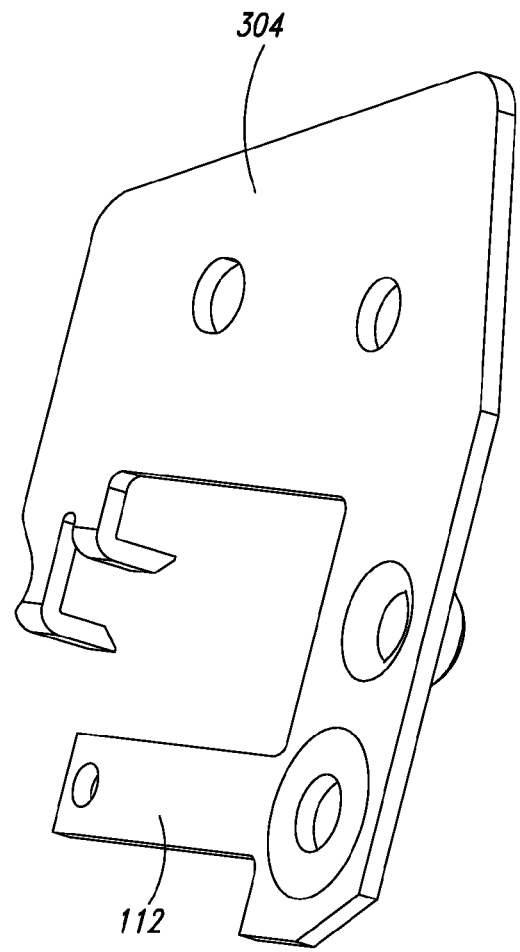
FIG. 7 is a perspective view of a cantilever beam and a base of the vibration absorber of FIG. 1, according to one illustrated embodiment.
Figure 8:
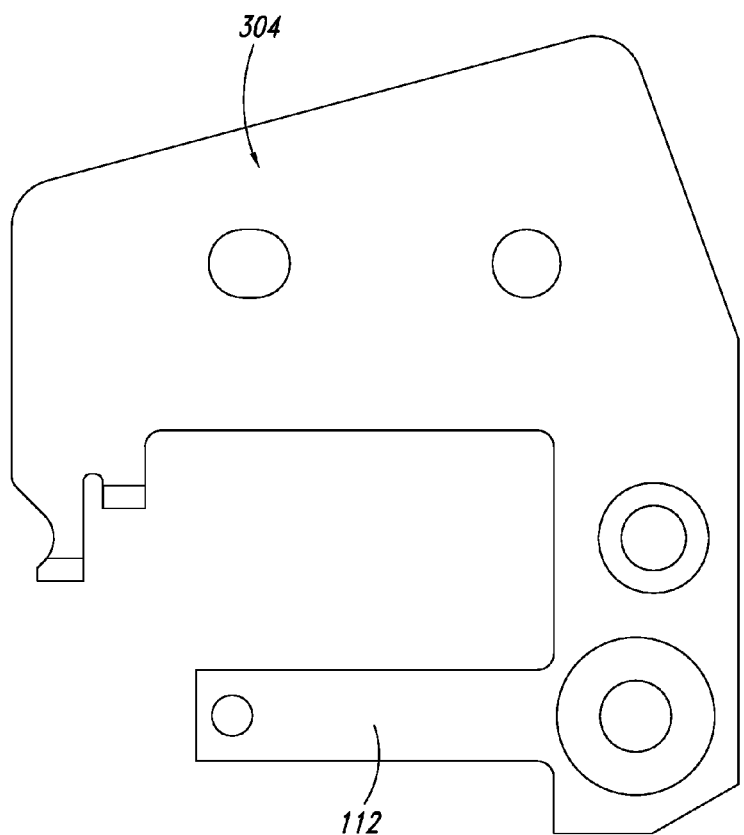
FIG. 8 is a top plan view of the cantilever beam and the base of FIG. 7, according to one illustrated embodiment.
Figure 9:
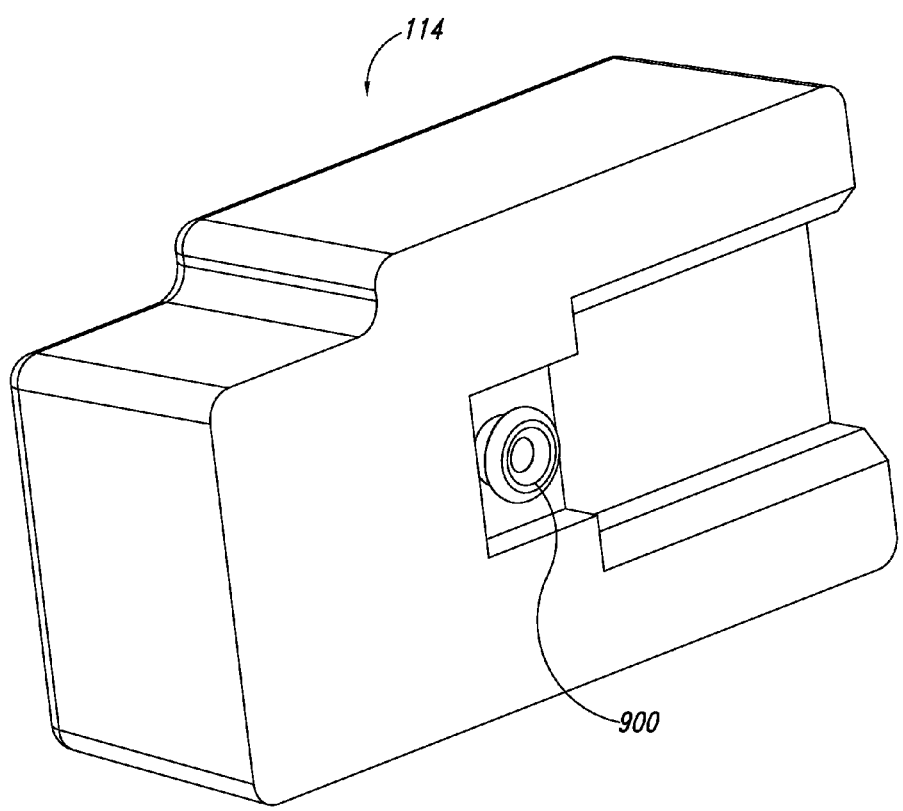
FIG. 9 is a perspective view of a mass of the vibration absorber of FIG. 1, according to one illustrated embodiment.

FIG. 2 illustrates an exemplary partial disk drive 200 including the vibration absorber 110 described above coupled to the disk drive base 202. The vibration absorber 110 is illustrated in its installed position within the disk drive 200 of FIG. 2, while many other disk drive components of the disk drive 200 have been omitted for clarity. FIGS. 3-6 show the vibration absorber 110 alone, according to one illustrated embodiment. FIGS. 3 and 4 show top and side perspective views of the vibration absorber 110, while a top plan view and a side view are shown in FIGS. 5 and 6, respectively. FIGS. 7 and 8 show a perspective view and a top plan view, respectively, of the cantilever beam 112 and a base of the vibration absorber 110. FIG. 9 shows a perspective view of the mass 114 of the vibration absorber 110. All of these Figures may be referenced with respect to the discussion below.

In one embodiment, the vibration absorber 110 includes a cantilever beam 112 having a fixed end 300 and a free end 302, and a mass 114 coupled to the free end 302. As illustrated in FIG. 2, the cantilever beam 112 may be coupled to the disk drive base 202 at the fixed end 300 of the cantilever beam 112. In one embodiment, a screw 204 may be used to couple the vibration absorber 110 to the disk drive base 202. Of course, in other embodiments, the fixed end 300 of the cantilever beam 112 may be coupled to the disk drive base 202 in any of a variety of ways, such as via adhesives, metallic bonding, mechanical bonding, interlaced engagement structures, etc. The fixed end 300 may provide a pivot axis about which the cantilever beam 112 oscillates during disk drive operation.

In one embodiment, the cantilever beam 112 may comprise an elongate metallic arm. For example, the cantilever beam 112 may comprise an elongate aluminum arm. Of course, in other embodiments, other materials may be used to achieve the desired resonance characteristics of the vibration absorber 110.

The mass 114 may also comprise any of a variety of materials. In some embodiments, relatively high density metals or other materials may be used for the mass 114. For example, in one embodiment, the mass 114 may comprise brass. In other embodiments, other materials for the mass 114 may be used, or the mass 114 may be omitted.

The weight of the mass 114 may be chosen such that the vibration absorber 110 is effective in damping the disk drive vibrations caused by the motor. If the mass 114 is too light, the vibration absorber 110 may damp relatively little of the vibrational energy of the disk drive base 202. However, if the mass 114 is too heavy and bulky, the mass 114 may be inappropriate for disk drive applications where space is at a premium. In one embodiment, the mass 114 may comprise at least 5% of the total weight of the disk drive 200. In another embodiment, the mass 114 may comprise at least 10% of the total weight of the disk drive 200. In still other embodiments, different weights for the mass 114 may be used to meet damping and space requirements.

In one embodiment, the mass 114 may be swaged or riveted to the cantilever beam 112. For example, a swage point 900, most clearly illustrated in FIG. 9, may be formed on the mass 114 to enable a swaging operation. Of course, in other embodiments, other mechanisms and/or structures may be used to couple the mass 114 to the cantilever beam 112. For example, the mass 114 may be screwed or bolted to the cantilever beam 112 in some embodiments.

The vibration absorber 110 may further include a base 304 to which the cantilever beam 112 is coupled. In one embodiment, the cantilever beam 112 and the base 304 may be monolithic. For example, both the cantilever beam 112 and the base 304 may be stamped or otherwise formed from a piece of sheet metal. The sheet metal may comprise any of a variety of metals, including aluminum, brass, copper, steel, etc. However, in other embodiments, the cantilever beam 112 and the base 304 may comprise separate components.

As shown in FIG. 4, the base 304 may further include orientation tabs 400 configured to engage a component of the disk drive 200. For example, the orientation tabs 400 may engage a filter positioned below the vibration absorber 110 within the disk drive 200. The orientation tabs 400 may facilitate accurate placement of the vibration absorber 110 within the disk drive 200. Moreover, the orientation tabs 400 may, together with the screw 204, help to securely position the vibration absorber 110 within the disk drive 200.

The base 304 may also incorporate other engagement features, such as engagement feature 402. The engagement feature 402 may comprise a drawn part of the metallic base 304. Of course, depending upon the geometry and configuration of other components within the disk drive 200, the vibration absorber 110 may include any of a variety of engagement features incorporated into the base 304 and/or cantilever beam 112.

In one embodiment (not shown), the vibration absorber may simply comprise a cantilever beam coupled to the disk drive base, the cantilever beam having a fixed end and a free end, and having a resonant frequency within 10% of the source vibration frequency. In such an embodiment, the cantilever beam may have sufficient mass to effectively dampen vibrations induced by a disk drive motor without the addition of a separate mass. In some embodiments, the cantilever beam may be irregularly shaped (e.g., asymmetrically shaped) to define a more massive free end, while, in other embodiments, the cantilever beam may define a mass gradient, whereby the cantilever beam becomes denser towards its free end. Still other embodiments may provide a combination of an irregularly shaped cantilever beam having a varying density along at least a portion of its length. Of course, differently configured vibration absorbers may be used in other embodiments. All of the above disclosure concerning the vibration absorber 110 may be applied similarly to a vibration absorber lacking a separate mass.

We claim:

1. A disk drive comprising:
   a disk drive base;
   a disk;
   an actuator arm actuatable over the disk;
   a motor coupled to the disk drive base and rotating the disk at a rotation frequency during operation of the disk drive; and
   a vibration absorber coupled to the disk drive base, the vibration absorber including:
   a cantilever beam having a fixed end and a free end; and
   a mass coupled to the free end of the cantilever beam;
   wherein the cantilever beam and the mass together have a resonant frequency within 10% of the rotation frequency.

2. The disk drive of claim 1, wherein the cantilever beam extends generally parallel to a plane of the disk.

3. The disk drive of claim 1, wherein the resonant frequency is within 2% of the rotation frequency.

4. The disk drive of claim 1, wherein the vibration absorber is coupled to the disk drive base in a region of the disk drive base farthest from the motor.

5. The disk drive of claim 4, wherein the vibration absorber is coupled proximate a corner of the disk drive base farthest from the motor.

6. The disk drive of claim 1, wherein the cantilever beam comprises an elongate aluminum arm.

7. The disk drive of claim 1, wherein the mass is at least 5% of a total weight of the disk drive.

8. The disk drive of claim 1, wherein the mass is riveted to the cantilever beam.

9. The disk drive of claim 1, wherein the vibration absorber further includes a base to which the cantilever beam is coupled, the base including orientation tabs configured to engage a component of the disk drive.

10. The disk drive of claim 9, wherein the cantilever beam and the base are monolithic.

11. The disk drive of claim 1, wherein the cantilever beam is coupled to the disk drive base at the fixed end of the cantilever beam.

12. A disk drive comprising:
    a disk drive base;
    a disk;
    an actuator arm actuatable over the disk;
    a motor coupled to the disk drive base and rotating the disk at a rotation frequency during operation of the disk drive; and
    a cantilever beam coupled to the disk drive base, the cantilever beam having a fixed end and a free end, and having a resonant frequency within 10% of the rotation frequency.

13. The disk drive of claim 12, wherein the cantilever beam has a resonant frequency within 2% of the rotation frequency.

14. The disk drive of claim 12, wherein the cantilever beam is coupled to the disk drive base in a region of the disk drive base farthest from the motor.

15. The disk drive of claim 14, wherein the cantilever beam is coupled proximate a corner of the disk drive base farthest from the motor.

16. The disk drive of claim 12, wherein the cantilever beam comprises an elongate aluminum arm.

17. The disk drive of claim 12, wherein the cantilever beam is coupled to a base, the base including orientation tabs configured to engage a component of the disk drive.

18. The disk drive of claim 17, wherein the cantilever beam and the base are monolithic.

19. The disk drive of claim 12, wherein the cantilever beam is coupled to the disk drive base at the fixed end of the cantilever beam.

* * * * *